US012696186B2

(12) United States Patent
Wang

(10) Patent No.: US 12,696,186 B2
(45) Date of Patent: Jul. 28, 2026

(54) METHOD, DEVICE AND COMPUTER STORAGE MEDIUM OF COMMUNICATION

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 452 days.

(21) Appl. No.: 17/914,698

(22) PCT Filed: Mar. 27, 2020

(86) PCT No.: PCT/CN2020/081817

§ 371 (c)(1),
(2) Date: Sep. 26, 2022

(87) PCT Pub. No.: WO2021/189462

PCT Pub. Date: Sep. 30, 2021

(65) Prior Publication Data

US 2023/0379815 A1     Nov. 23, 2023

(51) Int. Cl.
*H04W 48/20*         (2009.01)
*H04W 76/27*         (2018.01)

(52) U.S. Cl.
CPC ........... *H04W 48/20* (2013.01); *H04W 76/27* (2018.02)

(58) Field of Classification Search
CPC . H04W 48/20; H04W 72/1268; H04W 72/14; H04W 72/24; H04W 76/27; H04W 76/30; H04W 76/34; Y02D 30/70

(Continued)

(56) References Cited

U.S. PATENT DOCUMENTS

2012/0281566 A1    11/2012  Pelletier et al.
2016/0057797 A1*    2/2016  Bangolae .......... H04W 52/0229
                                                            370/311

(Continued)

FOREIGN PATENT DOCUMENTS

CN        106792608 A      5/2017
CN        108924964 A     11/2018

(Continued)

OTHER PUBLICATIONS

JP Office Action for JP Application No. 2022-558192, mailed on Mar. 26, 2024 with English Translation.

(Continued)

*Primary Examiner* — Jean A Gelin
(74) *Attorney, Agent, or Firm* — Sughrue Mion, PLLC

(57)             ABSTRACT

Embodiments of the present disclosure relate to methods, devices and computer readable media of communication. A method of communication implemented by a terminal device comprises determining, based on characteristics of traffic associated with uplink data, whether the uplink data is to be transmitted in an inactive state of the terminal device; and in accordance with a determination that the uplink data is to be transmitted in the inactive state, resuming radio bearers for the transmission of the uplink data in the inactive state; and transmitting, based on the radio bearers, the uplink data to the network device while the terminal device is in the inactive state. The method of communication implemented by a network device comprises receiving the uplink data; and transmitting, to the terminal device, a response to the reception of the uplink data. In this way, control scheme for small data transmission is provided.

18 Claims, 7 Drawing Sheets

100

(58) Field of Classification Search
USPC ........................................................ 370/329
See application file for complete search history.

(56) References Cited

U.S. PATENT DOCUMENTS

| | | | |
|---|---|---|---|
| 2017/0099660 A1 | 4/2017 | Oh | |
| 2018/0049244 A1 | 2/2018 | Lee | |
| 2018/0227961 A1 | 8/2018 | Mallick et al. | |
| 2019/0037447 A1 | 1/2019 | Lee et al. | |
| 2019/0037450 A1 | 1/2019 | Chang et al. | |
| 2019/0037635 A1 | 1/2019 | Guo et al. | |
| 2019/0313333 A1 | 10/2019 | Kim et al. | |
| 2019/0320316 A1 | 10/2019 | Mildh et al. | |
| 2020/0221418 A1* | 7/2020 | Kim .................... | H04W 68/005 |
| 2021/0211947 A1* | 7/2021 | Agiwal ................. | H04W 72/23 |
| 2021/0274525 A1* | 9/2021 | Wei ....................... | H04W 76/27 |
| 2021/0307055 A1* | 9/2021 | Tsai ...................... | H04W 76/30 |
| 2022/0256618 A1* | 8/2022 | Liu ...................... | H04W 72/115 |
| 2023/0180340 A1* | 6/2023 | Yue ...................... | H04L 1/1812 |
| | | | 370/328 |
| 2023/0397198 A1* | 12/2023 | Turtinen .............. | H04B 17/328 |

FOREIGN PATENT DOCUMENTS

| | | |
|---|---|---|
| CN | 107645779 | 12/2019 |
| EP | 3 361 820 A1 | 8/2018 |
| JP | 6637617 B2 | 1/2020 |
| KR | 2019-0001942 A | 1/2019 |
| WO | 2018/084762 A1 | 5/2018 |
| WO | 2018/126801 A1 | 7/2018 |
| WO | 2018/174427 A1 | 9/2018 |
| WO | 2021/136474 A1 | 7/2021 |
| WO | 2021/179317 A1 | 9/2021 |

OTHER PUBLICATIONS

3GPP, "3GPP TS36.331 V15.8.0 (Dec. 2019)", Jan. 8, 2020, pp. 1-pp. 964.

JP Office Communication for JP Application No. 2022-558192, mailed on Oct. 31, 2023 with English Translation.

International Search Report for PCT/CN2020/081817 dated Aug. 28, 2020.

Written Opinion for PCT/CN2020/081817 dated Aug. 28, 2020.

CN Office Action for CN Application No. 202080099120.5, mailed on Oct. 18, 2024 with English Translation.

Ericsson, "Report of [108#19] When to resume DRBs in UP optimization for 5GC", 3GPP TSG-RAN WG2 Meeting #109 electronic Tdoc R2-2000982, Feb. 14, 2020, pp. 1-6.

Ericsson, Huawei, "Protocol at SGi for non-IP case / Support for small data transmission without UDP/IP header", 3GPP TSG SA WG2 Meeting #110-AH S2-152902, Sep. 3, 2015, pp. 1-7.

IN Office Action for Indian Patent Application No. 202217054325, mailed on Apr. 8, 2024.

CN Office Communication for CN Application No. 202080099120. 5, mailed on Feb. 27, 2025 with English Translation.

ZTE, "(TP for NR BL CR for TS 38.401) Update on Inactive UE over F1 interface", 3GPP TSG RAN WG3 NR July Adhoc, R3-183704, Jul. 2-6, 2018, pp. 1-pp. 3.

Extended European Search Report corresponding to EP Patent Application No. 20926571.9-1215, issued on Mar. 23, 2023.

European Office Action corresponding to EP 20926571.9-1206, issued on Oct. 8, 2025.

* cited by examiner

100

300

310

IS UPLINK DATA TO BE TRANSMITTED
IN AN INACTIVE STATE?

YES

320

RESUME RADIO BEARERS FOR THE
TRANSMISSION OF THE UPLINK DATA IN
THE INACTIVE STATE

330

TRANSMIT THE UPLINK DATA TO THE
NETWORK DEVICE BASED ON THE RADIO
BEARERS WHILE THE TERMINAL DEVICE IS
IN THE INACTIVE STATE

400

410

IS CONFIGURED GRANT INFORMATION STORED?

NO

YES

420

IS TA VALID?

NO

YES

430

TRANSMIT, WITH THE CONFIGURED GRANT INFORMATION, THE UPLINK DATA IN THE INACTIVE STATE

440

TRANSMIT, BASED ON A RANDOM ACCESS PROCEDURE, THE UPLINK DATA IN THE INACTIVE STATE

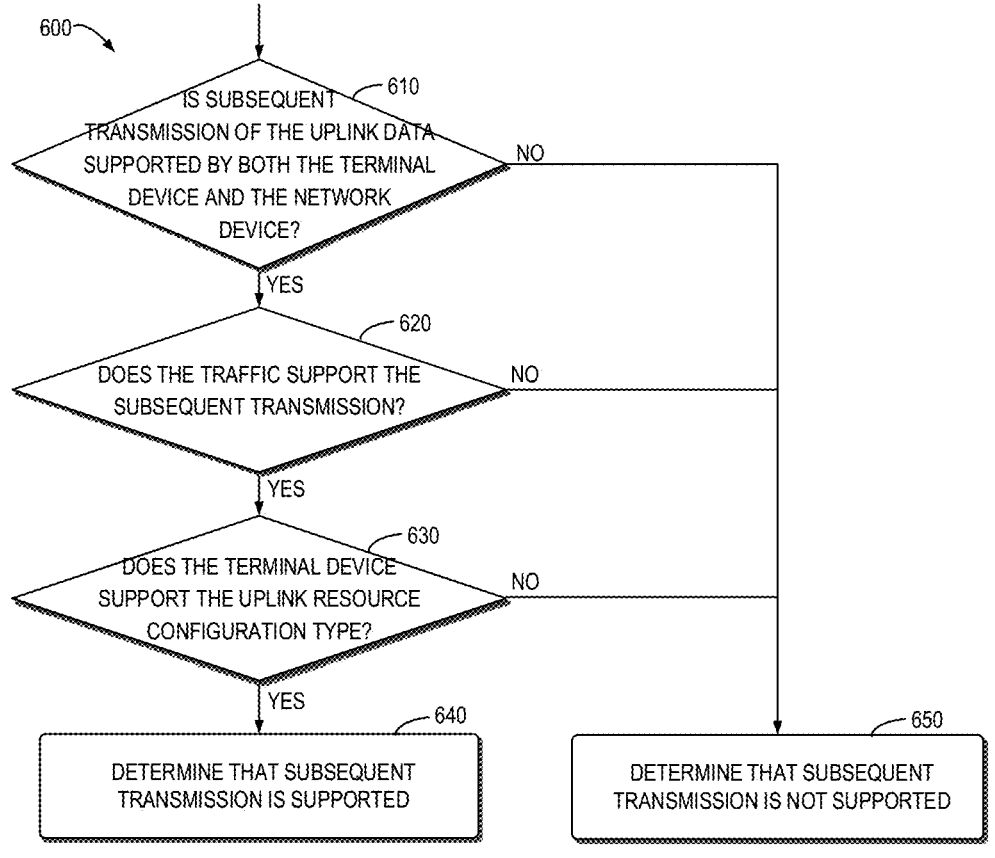

600

610

IS SUBSEQUENT TRANSMISSION OF THE UPLINK DATA SUPPORTED BY BOTH THE TERMINAL DEVICE AND THE NETWORK DEVICE?

NO

YES

620

DOES THE TRAFFIC SUPPORT THE SUBSEQUENT TRANSMISSION?

NO

YES

630

DOES THE TERMINAL DEVICE SUPPORT THE UPLINK RESOURCE CONFIGURATION TYPE?

NO

YES

640

DETERMINE THAT SUBSEQUENT TRANSMISSION IS SUPPORTED

650

DETERMINE THAT SUBSEQUENT TRANSMISSION IS NOT SUPPORTED

FIG. 6

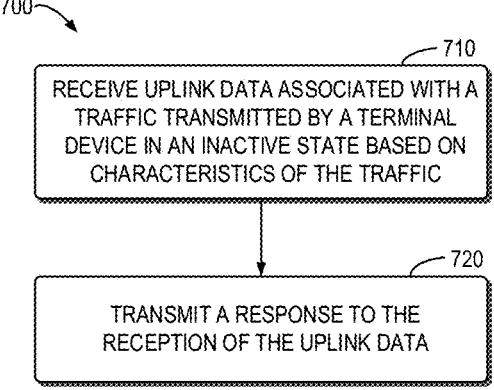

700

710

RECEIVE UPLINK DATA ASSOCIATED WITH A TRAFFIC TRANSMITTED BY A TERMINAL DEVICE IN AN INACTIVE STATE BASED ON CHARACTERISTICS OF THE TRAFFIC

720

TRANSMIT A RESPONSE TO THE RECEPTION OF THE UPLINK DATA

RECEIVE A SECOND INDICATION ABOUT A RESELECTION OF THE TERMINAL DEVICE DURING SUBSEQUENT TRANSMISSION OR DURING TRANSMISSION BASED ON CONFIGURED GRANT INFORMATION

820

STOR SCHEDULING AN UPLINK RESOURCE TO THE TERMINAL DEVICE

RECEIVE A THIRD INDICATION ABOUT A CHANGE OF THE TERMINAL DEVICE FROM THE INACTIVE STATE TO AN IDLE STATE

920

STOR SCHEDULING AN UPLINK RESOURCE TO THE TERMINAL DEVICE

PROCESSOR

MEMORY  1020

PROG  1030

FIG. 10

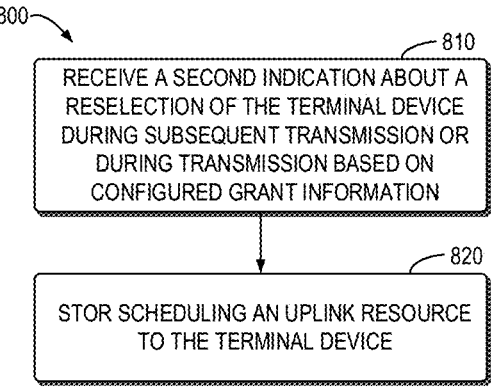
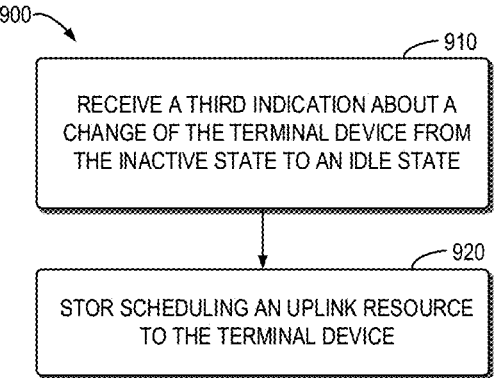
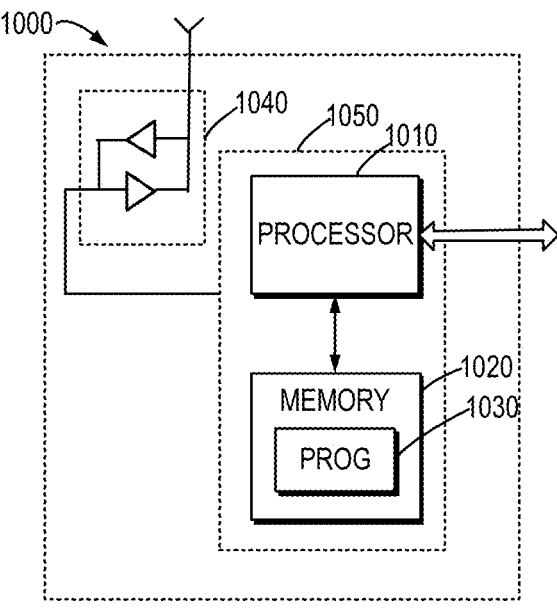

METHOD, DEVICE AND COMPUTER STORAGE MEDIUM OF COMMUNICATION

CROSS REFERENCE TO RELATED APPLICATIONS

This application is a National Stage of International Application No. PCT/CN2020/081817 filed Mar. 27, 2020.

TECHNICAL FIELD

Embodiments of the present disclosure generally relate to the field of telecommunication, and in particular, to methods, devices and computer storage media of communication for small data transmission (SDT) control.

BACKGROUND

Typically, a terminal device in an inactive state may still have small and infrequent data traffic to be transmitted (also referred to as SDT hereinafter). Until the third generation partnership project (3GPP) Release 16, the inactive state cannot support data transmission, and the terminal device has to resume the connection for any downlink and uplink data. Connection setup and subsequently release to the inactive state happens for each data transmission whatever small and infrequent the data packets are. This will result in unnecessary power consumption and signaling overhead.

In this event, 3GPP Release 17 has approved SDT based on a random access channel (RACH) and pre-configured physical uplink shared channel (PUSCH) resources in the inactive state. Thus, how to control SDT has become a hot issue.

SUMMARY

In general, embodiments of the present disclosure provide methods, devices and computer storage media of communication for SDT control.

In a first aspect, there is provided a method of communication. The method comprises: determining, at a terminal device and based on characteristics of traffic associated with uplink data, whether the uplink data is to be transmitted in an inactive state of the terminal device; and in accordance with a determination that the uplink data is to be transmitted in the inactive state, resuming radio bearers for the transmission of the uplink data in the inactive state; and transmitting, based on the radio bearers, the uplink data to the network device while the terminal device is in the inactive state.

In a second aspect, there is provided a method of communication. The method comprises: receiving, at a network device, uplink data associated with a traffic, the uplink data being transmitted by a terminal device in an inactive state based on characteristics of the traffic; and transmitting, to the terminal device, a response to the reception of the uplink data.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 6 illustrates an example method of determining whether subsequent transmission is supported in accordance with some embodiments of the present disclosure;

FIG. 7 illustrates an example method of communication implemented at a network device in accordance with some embodiments of the present disclosure;

FIG. 8 illustrates another example method of communication implemented at a network device in accordance with some embodiments of the present disclosure;

FIG. 9 illustrates another example method of communication implemented at a network device in accordance with some embodiments of the present disclosure; and FIG. 10 is a simplified block diagram of a device that is suitable for implementing embodiments of the present disclosure.

Throughout the drawings, the same or similar reference numerals represent the same or similar element.

DETAILED DESCRIPTION

Figure 1:
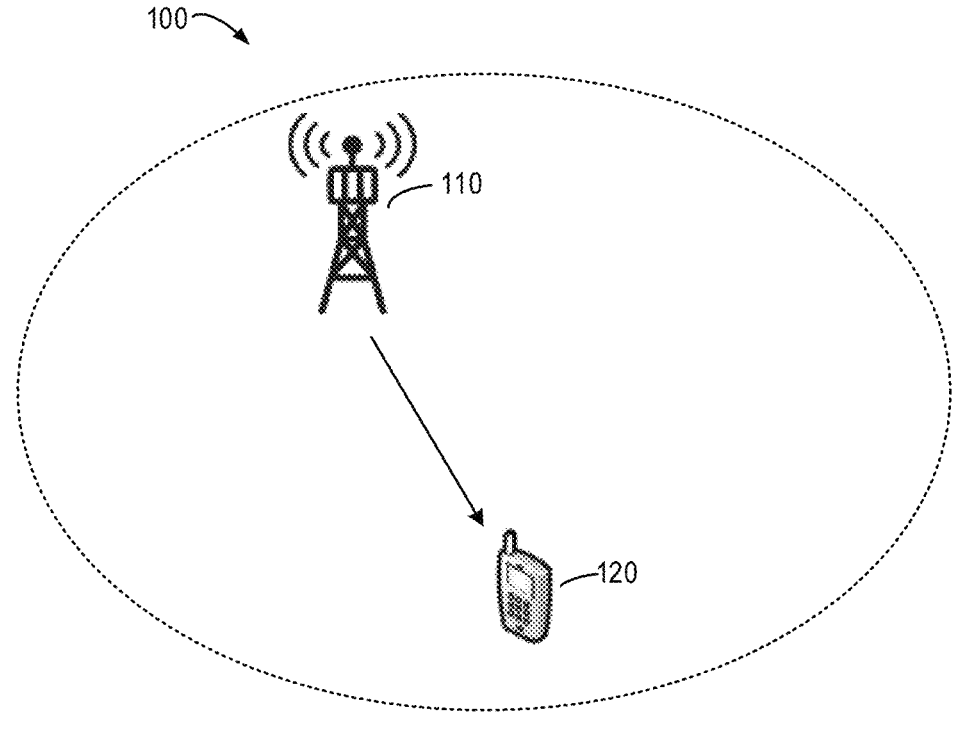
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' highest, 'minimum,' 'maximum,' or the like. It will be appreciated that such descriptions are intended to indicate that a selection among many used functional alternatives can be made, and such selections need not be better, smaller, higher, or otherwise preferable to other selections.

FIG. 1 illustrates a schematic diagram of an example communication network 100 in which embodiments of the present disclosure can be implemented. As shown in FIG. 1, the communication network 100 may include a network device 110 and a terminal device 120 served by the network device 110. The network device 110 and the terminal device 120 may communicate with each other via a channel such as a wireless communication channel. For example, the terminal device 120 may transmit data packets (i.e., uplink data) to the network device 110, and the network device 110 may transmit a response to reception of the uplink data to the terminal device 120.

It is to be understood that the number and type of devices in FIG. 1 are given for the purpose of illustration without suggesting any limitations to the present disclosure. The communication network 100 may include any suitable number of network devices and/or terminal devices adapted for implementing implementations of the present disclosure. Further, the communication network 100 may include any other devices than the network devices and the terminal devices, such as a core network element, but they are omitted here so as to avoid obscuring the present invention.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As mentioned above, the terminal device 120 in an inactive state may still have small and infrequent data traffic to be transmitted (also referred to as SDT hereinafter). In some embodiments, the small and infrequent data traffic may include smartphone applications such as traffic from instant messaging (IM) services (whatsapp, QQ, wechat etc.), heartbeat/keep-alive traffic from IM/email clients and other applications, and push notifications from various applications. In some embodiments, the small and infrequent data traffic may include non-smartphone applications such as traffic from wearables (periodic positioning information etc.), sensors (Industrial Wireless Sensor Networks transmitting temperature, pressure readings periodically or in an event triggered manner etc.), and smart meters and smart meter networks sending periodic meter readings.

Currently, a RACH-based scheme and transmission on pre-configured PUSCH have been approved to perform SDT in an inactive of a terminal device. However, no further detailed solutions on how to control the performance of SDT are proposed. Embodiments of the present disclosure provide a solution of communication for SDT control. The solution can achieve the control of SDT in the inactive state of the terminal device. Principles and implementations of the present disclosure will be described in detail below with reference to the figures.

Figure 2:
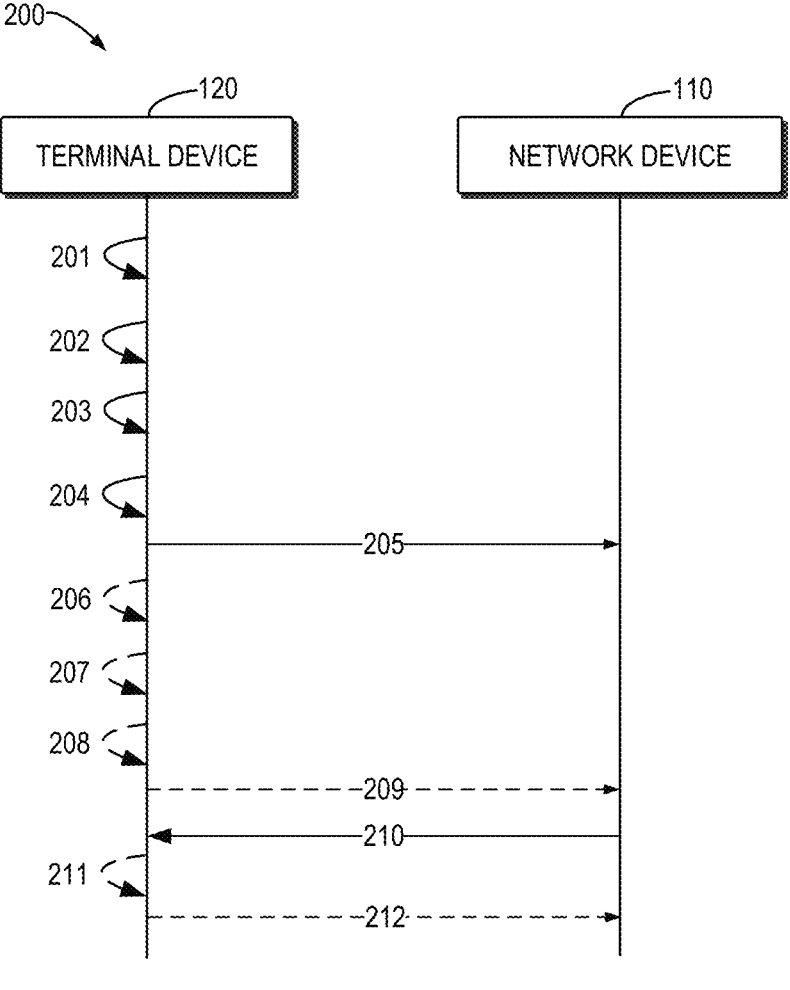
FIG. 2 illustrates a schematic diagram illustrating a process of communication for SDT control according to some embodiments of the present disclosure.

FIG. 2 illustrates a schematic diagram illustrating a process 200 of communication for SDT control according to some embodiments of the present disclosure. For the purpose of discussion, the process 200 will be described with reference to FIG. 1. The process 200 may involve the terminal device 120 and the network device 110 as illustrated in FIG. 1.

In case that the terminal device 120 in an inactive state has data packets (i.e., uplink data) to be transmitted, as shown in FIG. 2, the terminal device 120 may determine 201 whether the uplink data is to be transmitted in the inactive state. That is, the terminal device 120 may decide to whether perform SDT for transmission of the uplink tata. According to embodiments of the present disclosure, the triggering of SDT is based on different traffic or services that trigger the transmission of the uplink data.

In some embodiments, the terminal device 120 may initiate SDT when at least the following conditions are fulfilled: 1) the terminal device 120 is in radio resource control (RRC) inactive state, and the transmission is for mobile originating calls (i.e., uplink traffic); 2) the terminal device 120 supports SDT, and the system information of the network device 110 also indicates supporting SDT; 3) a fallback indication is not received from a media access control (MAC) layer of the terminal device 120; and 4) the traffic triggering the transmission supports SDT.

In some embodiments for condition 4), the terminal device 120 may determine at least one of an access category and an access identity of the traffic; and in accordance with a determination that the at least one of an access category and an access identity supports the transmission of the uplink data in the inactive state, determining that the uplink data is to be transmitted in the inactive state. In some embodiments, the access category or the access identity that supports SDT may be predefined. In some alternative embodiments, the access category or the access identity that supports SDT may be broadcasted by system information from the network device 110. In some alternative embodiments, the access category or the access identity that supports SDT may be configured to the terminal device 120 dedicatedly by a RRC message, for example, a RRCRelease message or any other suitable messages.

In some alternative embodiments, a certain access category or access identity for SDT may be introduced. For example, the value of the certain access category or access identity may be 10 or any other suitable numbers. In some alternative embodiments, a set of access categories or access identities may be considered to support SDT. For example, potential access categories or access identities that can be considered to support SDT may be 11-15 or any other suitable numbers.

In some alternative embodiments for condition 4), the terminal device 120 may determine a quality of service (QoS) parameter (i.e., 5QI) of a QoS flow of the traffic; and in accordance with a determination that the QoS parameter supports the transmission of the uplink data in the inactive state, determining that the uplink data is to be transmitted in the inactive state. In some embodiments, the 5QI value that supports SDT may be predefined. In some alternative embodiments, the 5QI value that supports SDT may be broadcasted by system information from the network device 110. In some alternative embodiments, the 5QI value that supports SDT may be configured to the terminal device 120 dedicatedly by a RRC message, for example, a RRCRelease message or any other suitable messages. In some alternative embodiments, a certain 5QI value for SDT may be introduced. For example, potential 5QI value that can be considered to support SDT may be 66 or any other suitable numbers.

In some alternative embodiments for condition 4), the terminal device 120 may determine one or more data radio bearers (DRBs) for the traffic; and in accordance with a determination that the one or more DRBs support the transmission of the uplink data in the inactive state, determining that the uplink data is to be transmitted in the inactive state. In some embodiments, the support of SDT by one DRB may be found in a stored UE context, as SDT is initiated for UE in an inactive state, and the configuration used for SDT is based on the stored UE context. In some alternative embodiments, the support of SDT of one DRB may be configured during a RRC connected state, i.e. by RRCReconfiguration message or any other suitable messages. In some alternative embodiments, the support of one DRB may be configured upon the terminal device 120 is caused to be in the inactive state, for example, by a RRCRelease message or any other suitable messages with a suspend indication.

In some alternative embodiments for condition 4), the terminal device 120 may receive, at a RRC layer of the terminal device 120 and from a non-access stratum (NAS) layer of the terminal device 120, a first indication about whether the uplink data is to be transmitted in the inactive state; and determine, based on the first indication from the NAS layer, whether the uplink data is to be transmitted in the inactive state.

As an additional embodiment for the above embodiments about condition 4), the terminal device 120 may further determine a size of buffered content associated with the traffic; and in accordance with a determination that the size of the buffered content is less than a threshold size, determining that the uplink data is to be transmitted in the inactive state. In some embodiments, the buffered content may refer to total uplink data and signaling available for transmission plus MAC header and where required, MAC control elements (CE).

In some embodiments, the threshold size may be broadcasted by system information from the network device 110. In some alternative embodiments, the threshold size may be a predetermined value. In some alternative embodiments, the threshold size that support SDT may be configured to the terminal device 120 dedicatedly by a RRC message, for example, a RRCRelease message.

The size of the buffered content can be used in combined with one or more of access categories, access identities, 5QIs and DRBs. In some embodiments, different access categories, access identities, 5QIs or DRBs may be associated with different values of the threshold size. So far, when the conditions for initiating the SDT are satisfied, the RRC layer of the terminal device 120 can initiate SDT procedure, instead of normal data transmission (also referred to as NDT hereinafter).

Return to FIG. 2, in response to determining 201 that the uplink data is to be transmitted in the inactive state, the terminal device 120 may resume 202 radio bearers for the transmission of the uplink data in the inactive state. In some embodiments, the RRC layer of the terminal device 120 may resume one or more DRBs that are needed to support the transmission of the uplink data in the inactive state. In addition, the RRC layer of the terminal device 120 may resume a signaling radio bearer 1 (SRB1) and a signaling radio bearer 2 (SRB2). Thereafter, the terminal device 120 may transmit the uplink data in the inactive state based on the resumed configuration.

The terminal device 120 may determine 203 whether configured grant information is stored for the transmission of the uplink data in the inactive state. In accordance with a determination that the configured grant information is stored, the terminal device 120 may determine 204 whether a time advance (TA) associated with the transmission of the uplink data is valid. In accordance with a determination that the TA is valid, the terminal device 120 may transmit 205, with the configured grant information, the uplink data in the inactive state.

In accordance with a determination that the configured grant information is not stored or the TA is not valid, the terminal device 120 may decide to transmit, based on a random access procedure, the uplink data in the inactive state. For example, the RRC layer of the terminal device 120 may configured the lower layer (i.e., MAC layer) to perform random access based SDT.

Upon transmitting the uplink data based on a random access procedure, the terminal device 120 may determine 206, at the RRC layer, whether subsequent transmission (i.e., subsequent SDT) is supported. In other words, the terminal device may determine whether only one shot SDT or the subsequent SDT is supported. In some embodiments, the RRC layer of the terminal device 120 may determine whether subsequent transmission is supported, and then inform the lower layer (i.e., MAC layer) whether the subsequent transmission is supported. In some embodiments, the RRC layer may inform the MAC layer of the threshold size used in initiation of SDT for later comparison with a size of buffered content associated with the uplink data.

In some embodiments, the RRC layer of the terminal device 120 may determine whether the subsequent transmission of the uplink data is supported by both the terminal device 120 and the network device 110. According to embodiments of the present disclosure, two types of subsequent SDT can be supported: configured grant based subsequent SDT and dynamic grant based subsequent SDT. The configured grant based subsequent SDT refers to transmission of uplink small data on pre-configured PUSCH resources (i.e., reusing the configured grant type 1 when a time advance (TA) associated with the transmission is valid). The dynamic grant based subsequent SDT refers to transmission of uplink small data on dynamically scheduled PUSCH resources.

In some embodiments, information about at least one of whether the subsequent transmission can be supported by the network device 110 and which types of the subsequent transmission can be supported by the network device 110 may be broadcasted by system information from the network device 110. In some embodiments, information about whether subsequent transmission can be supported by the terminal device 120 and which types of the subsequent transmission can be supported by the terminal device 120 may be configured to the terminal device 120 by a RRC message from the network device 110, for example, RRCRelease message or any other suitable messages. In some embodiments, whether the subsequent transmission can be supported and which types of the subsequent transmission can be supported may be associated with the access category, the access identity, 5QI or DRB.

In accordance with a determination that the subsequent transmission is not supported by both the terminal device 120 and the network device 110, determine that the subsequent transmission is not supported.

In some additional embodiments, in accordance with a determination that the subsequent transmission is supported by both the terminal device 120 and the network device 110, the terminal device 120 may further determine whether the traffic supports the subsequent transmission of the uplink data. In some embodiments, the support by the traffic for the subsequent transmission may be broadcasted by system information from the network device 110. It should be noted that any other suitable forms are also feasible.

In some additional embodiments, in accordance with a determination that the traffic supports the subsequent transmission of the uplink data, the terminal device 120 may further determine an uplink resource configuration type for the subsequent transmission supported by the traffic. For example, the terminal device 120 may determine whether the traffic supports dynamic grant or configured grant. In accordance with a determination that the terminal device does not support the uplink resource configuration type, the terminal device 120 may determine that the subsequent transmission is not supported, and in accordance with a determination that the terminal device supports the uplink resource configuration type, the terminal device 120 may determine that the subsequent transmission is supported.

In accordance with a determination that the traffic does not support the subsequent transmission, the terminal device 120 may determine that the subsequent transmission is not supported.

Return to FIG. 2 again, upon determining that the subsequent transmission is not supported and informing the MAC layer that the subsequent transmission is not supported (i.e., only one shot SDT is supported), the terminal device 120 may determine 207, at the MAC layer, whether a size of buffered content associated with the traffic is larger than a threshold size. In some embodiments, the buffered content may refer to total uplink data and signaling available for transmission plus MAC header and where required, MAC CE. The threshold size may be informed by the RRC layer to the MAC layer, and may be similar with that described in 210 with reference to FIG. 2.

In accordance with a determination that the size of the buffered content is less than or equal to the threshold size, the terminal device 120 may determine 208 whether there is a dedicated resource having a size larger than or equal to the threshold size. In accordance with a determination that there is the dedicated resource having a size larger than or equal to the threshold size, the terminal device 120 may transmit 209, with the dedicated resource, the uplink data in the inactive state.

In accordance with a determination that the size of the buffered content is larger than the threshold size or there is no dedicated resource having a size larger than or equal to the threshold size, the terminal device 120 may cancel the transmission of the uplink data in the inactive state. In some embodiments, the MAC layer of the terminal device 120 may inform the upper layer (i.e., RRC layer) that SDT is cancelled. In this way, NDT will be performed for transmission of the uplink data.

In response to determining 206 that the subsequent transmission is supported, the terminal device 120 may determine an uplink resource configuration for the transmission of the uplink data, and transmitting the uplink data on the uplink resource configuration. The determination and transmission can be carried out in any suitable ways.

In some additional embodiments where the uplink data is transmitted based on a random access procedure, the terminal device 120 may generate a RRC message indicating that the uplink data is transmitted in the inactive state, and transmit the RRC message and the uplink data to the network device 110 in the random access procedure. For example, the terminal device 120 may set, at the RRC layer, a resume cause IE in RRCConnectionResumeRequest message as a new one which indicates SDT, and submit the RRCConnectionResumeRequest message to the lower layer (i.e., MAC layer) for the transmission. It should be noted that any other suitable forms are also feasible.

In some alternative or additional embodiments where the uplink data is transmitted based on a random access procedure, the terminal device 120 may provide, from RRC layer to the lower layer (i.e., MAC layer) of the terminal device 120, a MAC CE carrying an identity (for example, an inactive radio network temporary identifier (I-RNTI)) of the terminal device 120, and transmit, to the network device 110, the MAC CE and the uplink data in the random access procedure. It should be noted that this is merely an example, and any other suitable forms are also feasible.

Return to FIG. 2 again, upon receiving the uplink data, the network device 110 may transmit 210 a response to the reception of the uplink data. In some embodiments where the subsequent transmission is not supported, the network device 110 may reply the terminal device 120 with a first RRC message that informs the terminal device 120 to suspend the radio bearers for the transmission of the uplink data in the inactive state. For example, the first RRC message may be a RRCRelease message. Alternatively, the first RRC message may be a RRCReject message. It should be noted that any other suitable messages are also feasible.

In some embodiments where anchor relocation occurs from a second network device (not shown) to the network device 110, the first RRC message may comprise suspend configuration. The second network device is a network device serving the terminal device 120 immediately before the terminal device 120 changes from a connected state to the inactive state, i.e., a last serving network device.

Upon receiving the first RRC message, the terminal device 120 may suspend 211 the radio bearers for the transmission of the uplink data in the inactive state. For example, the terminal device 120 may suspend one or more DRBs for transmission of the uplink data in the inactive state. In addition, the terminal device 120 may further suspend SRB1 and SRB2. In this way, the terminal device 120 returns to a normal inactive state without data transmission.

In some embodiments where the subsequent transmission is supported, the network device 110 may reply the terminal device 120 with a second RRC message that comprises an uplink resource configuration for the subsequent transmission. In some embodiments, the uplink resource configuration may be associated with dynamic grant for the subsequent transmission. In some alternative embodiments, the uplink resource configuration may be associated with configured grant for the subsequent transmission. For example, the second RRC message may be a RRCRelease message. Alternatively, the second RRC message may be a RRCReject message. It should be noted that any other suitable messages are also feasible.

In some embodiments where anchor relocation occurs from a second network device (not shown) to the network device 110, the second RRC message may comprise suspend configuration. The second network device is a network device serving the terminal device 120 immediately before the terminal device 120 changes from a connected state to the inactive state, i.e., a last serving network device.

Upon receiving the second RRC message, the terminal device 120 may perform 212, with the uplink resource, the subsequent transmission of the uplink data in the inactive state. For example, the terminal device 120 may maintain at the inactive state, maintain one or more current active SRBs and DRBs, maintain a packet data convergence protocol (PDCP) status variable, and maintain a security key. In this way, the terminal device 120 may start the subsequent transmission.

Currently, for the terminal device 120 in the inactive state, if reselecting from a first cell served by the network device 110 to a second cell served by a third network device (not shown) while a timer T319 is running (i.e., a RRCResumeRequest message is sent but no response is received), the terminal device 120 would enter an idle state. However, during subsequent SDT, as there is no measurement and report mechanism, the network device 110 is not aware of that the terminal device 120 has moved to other cells, and may continue allocating resource for the terminal device 120, especially in case of configured grant based subsequent SDT, which result in radio resource waste.

In view of the above, embodiments of the present disclosure provide network control of SDT upon state transition. In some embodiments where the cell reselection occurs during the transmission (first shot SDT) of the uplink data while no response is received from the network device 110, the terminal device 120 may enter an idle state, and retransmit the uplink data to the third network device.

In some embodiments where the cell reselection occurs during the subsequent transmission of the uplink data or during transmission of the uplink data based on configured grant information, the terminal device 120 may enter an idle state, and releasing an uplink resource configuration for the transmission of the uplink data in the inactive state. In some alternative embodiments, the terminal device 120 may stop the subsequent transmission, but remain at the inactive state. In this case, the terminal device 120 may suspend the radio bearers for the transmission of the uplink data in the inactive state. For example, the terminal device 120 may suspend all SRBs and DRBs for SDT except SRB0, and indicate from the RRC layer to the lower layer (i.e., MAC layer) of PDCP suspend. In some embodiments, the terminal device 120 may further release an uplink resource configuration for the transmission of the uplink data in the inactive state. In some embodiments, the terminal device 120 may further reevaluate the validity of SDT and reinitiate SDT if needed.

In some additional or alternative embodiments where the cell reselection occurs during the subsequent transmission of the uplink data or during transmission of the uplink data based on configured grant information, the terminal device 120 may generate a second indication about the reselection, and transmit the second indication to the network device 110. For example, the terminal device 120 may send a bye message to inform the network device 110 of the cell reselection, so that the network device 110 can stop providing uplink grant for the terminal device 120 for subsequent SDT.

In some embodiments, the terminal device 120 may transmit the second indication via a RRC message. For example, the RRC message may be a UEAssistanceInfomation message or any other suitable messages. In some alternative embodiments, the terminal device 120 may transmit the second indication via a MAC CE. For example, the MAC CE may have a fixed size of zero bits. It should be noted that any other suitable forms of the MAC CE are also feasible. In some alternative embodiments, the terminal device 120 may transmit the second indication via a physical (PHY) layer indication. For example, the terminal device 120 may use a dedicated scheduling request (SR) configuration to indicate the cell reselection during the subsequent SDT or configured grant based SDT.

Generally, there are some cases that the terminal device 120 will changes from the inactive state to an idle state. In some embodiments, when the terminal device 120 in the inactive state receives core network (CN) paging, the terminal device 120 will changes from the inactive state to an idle state. In some embodiments, in case of inability to comply with RRCResume, the terminal device 120 will changes from the inactive state to an idle state. In some embodiments, when the timer T319 expiry or integrity check failure from lower layers while the timer T319 is running, the terminal device 120 will changes from the inactive state to an idle state. In some embodiments, in case of cell re-selection while the timer T319 or T302 is running, the terminal device 120 will changes from the inactive state to an idle state. In some embodiments, when the terminal device 120 failed to trigger RNA due to AC barring, the terminal device 120 will changes from the inactive state to an idle state.

In these embodiments where the terminal device 120 changes from the inactive state to an idle state, the terminal device 120 may generate a third indication about the change, transmitting the third indication to the network device 110, and release an uplink resource configuration for the transmission of the uplink data in the inactive state. For example, the terminal device 120 may send a bye message to inform the network device 110 of the change, so that the network device 110 can stop providing uplink grant for the terminal device 120 for subsequent SDT. The third indication can be carried out in a similar way as the second indication, and its details are not repeated here.

With the process described with above, SDT can be well controlled. Corresponding to the process, embodiments of the present disclosure also provide methods of communication implemented at a terminal device and a network device respectively. It will be described in more details with reference to FIGS. 3-9.

Figure 3:
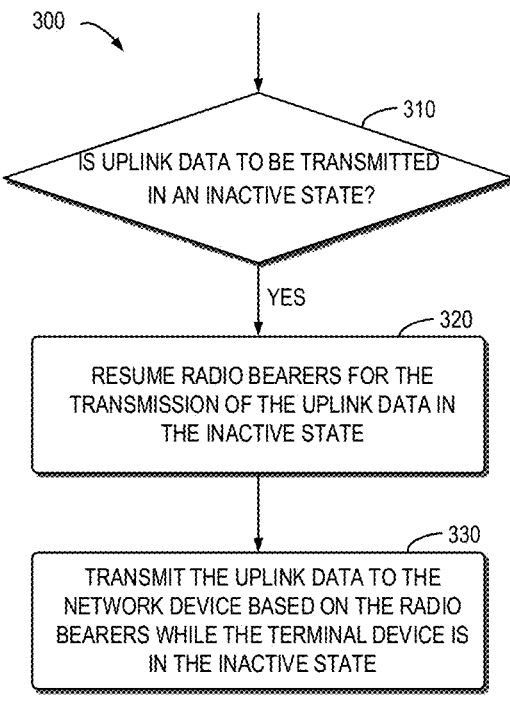
FIG. 3 illustrates an example method of communication implemented at a terminal device in accordance with some embodiments of the present disclosure.

FIG. 3 illustrates an example method 300 of communication implemented at a terminal device in accordance with some embodiments of the present disclosure. For example, the method 300 may be performed at the terminal device 120 as shown in FIG. 1. For the purpose of discussion, in the following, the method 300 will be described with reference to FIG. 1. It is to be understood that the method 300 may include additional blocks not shown and/or may omit some blocks as shown, and the scope of the present disclosure is not limited in this regard.

As shown in FIG. 3, at block 310, the terminal device 120 determines, based on characteristics of traffic associated with uplink data, whether the uplink data is to be transmitted in an inactive state of the terminal device 120. That is, the validity of SDT is evaluated.

In some embodiments, the terminal device 120 may determine at least one of an access category and an access identity of the traffic, and in accordance with a determination that the at least one of an access category and an access identity supports the transmission of the uplink data in the inactive state, determine that the uplink data is to be transmitted in the inactive state.

In some alternative embodiments, the terminal device 120 may determine a QoS parameter of a QoS flow of the traffic, and in accordance with a determination that the QoS parameter supports the transmission of the uplink data in the inactive state, determine that the uplink data is to be transmitted in the inactive state.

In some alternative embodiments, the terminal device 120 may determine one or more DRBs for the traffic, and in accordance with a determination that the one or more DRBs support the transmission of the uplink data in the inactive state, determine that the uplink data is to be transmitted in the inactive state.

In some alternative embodiments, the terminal device 120 may receive, at a RRC layer of the terminal device 120 and from a NAS layer of the terminal device 120, a first indication about whether the uplink data is to be transmitted in the inactive state, and determine, based on the first indication, whether the uplink data is to be transmitted in the inactive state.

In some additional embodiments, the terminal device 120 may further determine a size of buffered content associated with the traffic, and in accordance with a determination that the size of the buffered content is less than a threshold size, determine that the uplink data is to be transmitted in the inactive state. Other details about the determination on whether the uplink data is to be transmitted in the inactive state are similar with that described in 201 with reference to FIG. 2, and thus are not repeated here.

At block 320, the terminal device 120 resumes radio bearers for the transmission of the uplink data in the inactive state. In some embodiments, the terminal device 120 may resume one or more DRBs that are needed to support the transmission of the uplink data in the inactive state. The operations at block 320 are similar with that described in 202 with reference to FIG. 2 and other details are omitted here.

Figure 4:
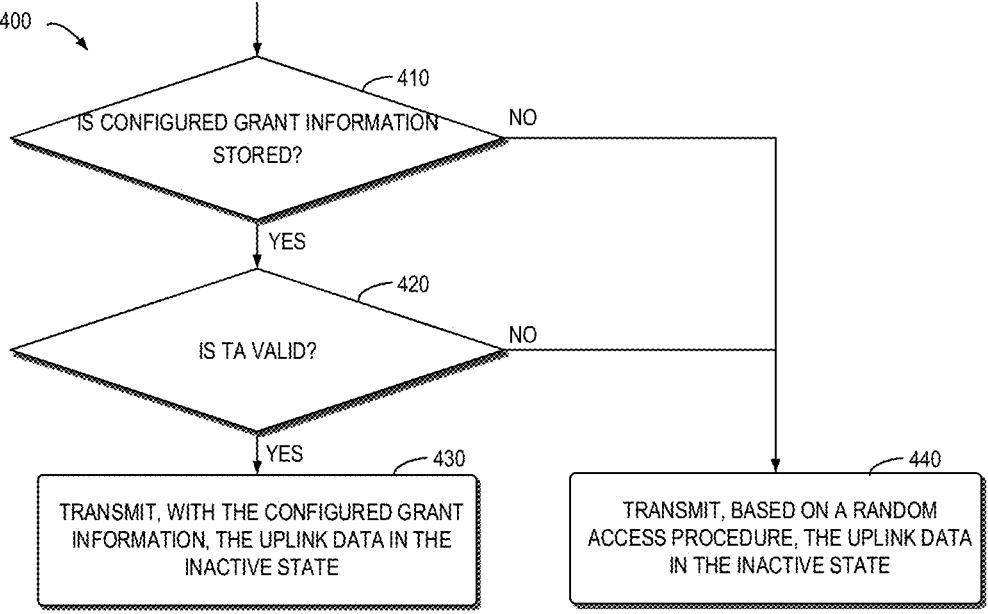
FIG. 4 illustrates an example method of transmission of uplink data in an inactive state in accordance with some embodiments of the present disclosure.

At block 330, the terminal device 120 transmits the uplink data to the network device 110 based on the configuration while the terminal device 120 is in the inactive state. Its details will be described below with reference to FIG. 4. FIG. 4 illustrates an example method 400 of transmission of uplink data in an inactive state in accordance with some embodiments of the present disclosure. For example, the method 400 may be performed at the terminal device 120 as shown in FIG. 1. For the purpose of discussion, in the following, the method 400 will be described with reference to FIG. 1. It is to be understood that the method 400 may include additional blocks not shown and/or may omit some blocks as shown, and the scope of the present disclosure is not limited in this regard.

As shown in FIG. 4, at block 410, the terminal device 120 may determine whether configured grant information is stored for the transmission of the uplink data in the inactive state. If determining that the configured grant information is stored, at block 420, the terminal device 120 may determine whether a TA associated with the transmission of the uplink data is valid. If determining that the TA is valid, at block 430, the terminal device 120 may transmit, with the configured grant information, the uplink data in the inactive state.

If determining at block 410 that the configured grant information is not stored or if determining at block 420 that the TA is not valid, at block 440, the terminal device 1210 may transmit, based on a random access procedure, the uplink data in the inactive state.

Figure 5:
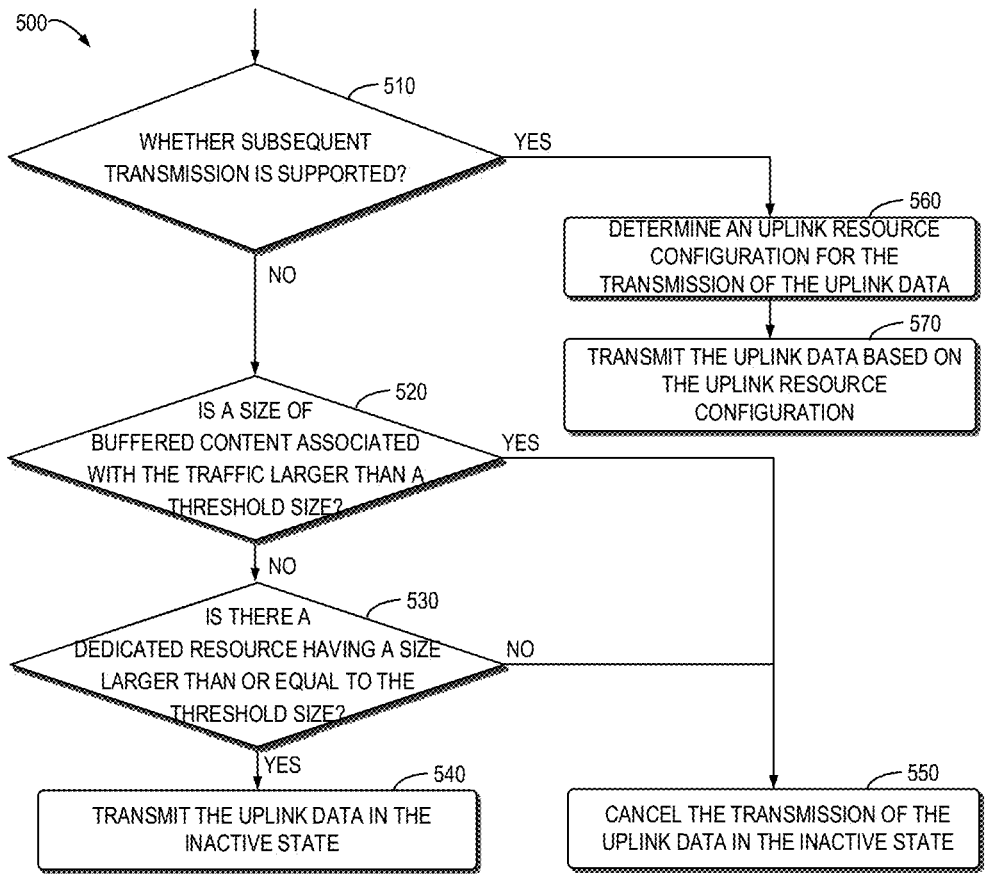
FIG. 5 illustrates another example method of transmitting uplink data based on a random access procedure in accordance with some embodiments of the present disclosure.

FIG. 5 illustrates an example method 500 of transmitting uplink data based on a random access procedure in accordance with some embodiments of the present disclosure. For example, the method 500 may be performed at the terminal device 120 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard. This embodiment considers whether subsequent SDT (also referred to as subsequent transmission herein) is supported and provides corresponding network control scheme.

As shown in FIG. 5, at block 510, the terminal device 120 may determine, at a RRC layer, whether subsequent transmission of the uplink data is supported. Its details will be described below with reference to FIG. 6. FIG. 6 illustrates an example method 600 of determining whether subsequent transmission is supported in accordance with some embodiments of the present disclosure. For example, the method 600 may be performed at the terminal device 120 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard.

As shown in FIG. 6, at block 610, the terminal device 120 may determine whether subsequent transmission of the uplink data is supported by both the terminal device 120 and the network device 110. If determining at block 610 that the subsequent transmission is not supported by both the terminal device 120 and the network device 110, the process may enter block 650. At block 650, the terminal device 120 may determine that the subsequent transmission is not supported.

If determining at block 610 that the subsequent transmission is supported by both the terminal device 120 and the network device 110, at block 620, the terminal device 120 may determine whether the traffic supports the subsequent transmission. If determining at block 620 that the traffic does not support the subsequent transmission, the process may also enter block 650. At block 650, the terminal device 120 may determine that the subsequent transmission is not supported.

If determining at block 620 that the traffic supports the subsequent transmission, the terminal device 120 may determine, at block 630, whether the terminal device 120 supports an uplink resource configuration type for the subsequent transmission supported by the traffic. If determining at block 630 that the terminal device 120 does not support the uplink resource configuration type, the process may also enter block 650. At block 650, the terminal device 120 may determine that the subsequent transmission is not supported.

If determining at block 630 that the terminal device 120 supports the uplink resource configuration type, the terminal device 120 may determine, at block 640, that the subsequent transmission is supported. Other details for determining whether the subsequent transmission is supported are similar with that described in 206 with reference to FIG. 2, and thus are not repeated here.

It should be noted that the above example in FIG. 6 is merely for illustration, and is not intended to limit the present disclosure. Any other suitable solutions are also feasible for determining whether the subsequent transmission is supported.

Now return to FIG. 5, if determining at block 510 that the subsequent transmission is not supported, at block 520, the terminal device 120 may determine whether a size of buffered content associated with the traffic is larger than a threshold size. In some embodiments, the buffered content may refer to total uplink data and signaling available for transmission plus MAC header and where required, MAC CE. In some embodiments, the buffered content may refer to total uplink data and signaling available for transmission plus MAC header and where required, MAC CE. The details about the threshold size are similar with that described in 201 with reference to FIG. 2, and are not repeated here.

If determining at block 520 that the size of the buffered content associated with the traffic is not larger than the threshold size, i.e., less than or equal to the threshold size, at block 530, the terminal device 120 may determine whether there is a dedicated resource having a size larger than or equal to the threshold size. If determining at block 530 that there is the dedicated resource, at block 540, the terminal device 120 may transmit the uplink data in the inactive state.

If determining at block 530 that there is no dedicated resource having a size larger than or equal to the threshold size, or if determining at block 520 that the size of the buffered content is larger than the threshold size, the process enters block 550. At block 550, the terminal device 120 may cancel the transmission of the uplink data in the inactive state.

If determining at block 510 that the subsequent transmission is supported, at block 560, the terminal device 120 may determine an uplink resource configuration for the transmission of the uplink data, and at block 570, the terminal device 120 may transmit the uplink data based on the uplink resource configuration. In some embodiments, the operations at block 560 and 570 may be carried out by the method 400 described above. It should be noted that, any other suitable methods are also feasible.

In some embodiments, the terminal device 120 may receive from the network device 110, a first RRC message that informs the terminal device 120 to suspend the radio bearers for the transmission of the uplink data in the inactive state, and suspend the radio bearers in response to receiving the first RRC message. In some embodiments where anchor relocation occurs from a second network device to the network device 110, the RRC message may comprise suspend configuration. The second network device is a network device serving the terminal device 120 immediately before the terminal device 120 changes from a connected state to the inactive state, i.e., a last serving network device for the terminal device 120.

In some alternative embodiments, the terminal device 120 may receive, from the network device, a second RRC message comprising an uplink resource configuration for subsequent transmission of the uplink data, and perform, with the uplink resource configuration, the subsequent transmission in the inactive state.

In some embodiments where the terminal device 120 reselects from a first cell served by the network device 110 to a second cell served by a third network device not shown during the transmission of the uplink data while no response to the transmission of the uplink data is received from the network device 110, the terminal device 120 may enter an idle state. In addition, the terminal device 120 may retransmit the uplink data to the third network device.

In some embodiments where the terminal device 120 reselects from a first cell served by the network device 110 to a second cell served by a third network device during subsequent transmission of the uplink data or during transmission of the uplink data based on configured grant information, the terminal device 120 may enter an idle state, and release an uplink resource configuration for the transmission of the uplink data in the inactive state.

In some alternative embodiments where the terminal device 120 reselects from a first cell served by the network device 110 to a second cell served by a third network device during subsequent transmission of the uplink data or during transmission of the uplink data based on configured grant information, the terminal device 120 may stop the subsequent transmission, suspend the radio bearers for the transmission of the uplink data and release an uplink resource configuration for the transmission of the uplink data in the inactive state. In addition, the terminal device 120 may redetermine whether the uplink data is to be transmitted in the inactive state, and in accordance with a redetermination that the uplink data is to be transmitted in the inactive state, reinitiate the transmission of the uplink data. For example, the terminal device 120 may repeat the processes described in FIG. 3 to reevaluate the validity of SDT and reinitiate the SDT if needed.

In some alternative or additional embodiments where the terminal device 120 reselects from a first cell served by the network device 110 to a second cell served by a third network device during subsequent transmission of the uplink data or during transmission of the uplink data based on configured grant information, the terminal device 120 may generate a second indication about the reselection, and transmit the second indication to the network device 110.

In some embodiments where the terminal device 120 changes from the inactive state to an idle state, the terminal device 120 may generate a third indication about the change, transmit the third indication to the network device 110, and release an uplink resource configuration for the transmission of the uplink data in the inactive state.

With the above SDT control scheme implemented at a terminal device, conditions for initiating SDT are defined, detailed RRC procedure upon the initiation of SDT is provided and UE behavior in case of cell reselection occurs during subsequent SDT are also provided.

Hereinafter, the SDT control scheme implemented at a network device will be described. FIG. 7 illustrates an example method 700 of communication implemented at a network device in accordance with some embodiments of the present disclosure. For example, the method 700 may be performed at the network device 110 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

As shown in FIG. 7, at block 710, the network device 110 receives uplink data associated with a traffic. The uplink data is transmitted by the terminal device 120 in an inactive state based on characteristics of the traffic. In some embodiments where the network device 110 transmits, to the terminal device 120, configured grant information for the transmission of the uplink data in the inactive state, the network device 110 may receive the uplink data based on the configured grant information.

In some embodiments, the network device 110 may receive, from the terminal device 120, the uplink data and a RRC message in a random access procedure. The RRC message may indicate that the uplink data is transmitted in the inactive state.

At block 720, the network device 110 may transmit, to the terminal device 120, a response to the reception of the uplink data. In some embodiments, the network device 110 may transmit, in the response, a first RRC message that informs the terminal device 120 to suspend radio bearers for the transmission of the uplink data in the inactive state. In some embodiments where anchor relocation of the terminal device 120 occurs from a second network device to the network device, the first RRC message may comprise suspend configuration. The second network device is a network device serving the terminal device immediately before the terminal device 120 changes from a connected state to the inactive state, i.e., a last serving network device.

In some alternative embodiments, the network device 110 may transmit, in the response, a second RRC message comprising an uplink resource configuration for subsequent transmission of the uplink data. In some embodiments, the uplink resource configuration may be associated with dynamic grant subsequent SDT. In some alternatively embodiments, the uplink resource configuration may be associated with configured grant subsequent SDT. In some embodiments where anchor relocation of the terminal device 120 occurs from a second network device to the network device, the second RRC message may comprise suspend configuration. The second network device is a network device serving the terminal device immediately before the terminal device 120 changes from a connected state to the inactive state, i.e., a last serving network device.

In some additional embodiments, the network device 110 may transmit information about whether the network device 110 supported subsequent transmission of the uplink data. For example, the network device 110 may broadcast the information via system information. Alternatively, the network device 110 may configure the information to the terminal device 120 via a RRC message.

So far, the network response to the first shot SDT is provided. The following description is given for the network control of subsequent SDT with reference to FIGS. 8 and 9. FIG. 8 illustrates another example method 800 of communication implemented at a network device in accordance with some embodiments of the present disclosure. For example, the method 800 may be performed at the network device 110 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard. This embodiment describes the behavior upon cell reselection.

As shown in FIG. 8, at block 810, the network device 110 may receive, from the terminal device 120, a second indication about a reselection of the terminal device 120 from a first cell served by the network device 110 to a second cell served by a third network device (not shown) during subsequent transmission of the uplink data or during transmission of the uplink data based on configured grant information. In some embodiments, the network device 110 may receive the second indication via a RRC message. In some alternative embodiments, the network device 110 may receive the second indication via a MAC CE. In some alternative embodiments, the network device 110 may receive the second indication via a PHY layer indication. Other details are similar with that described in connection with the transmission of the second indication, and are not repeated here.

In response to receiving the second indication, at block 820, the network device 110 may stop scheduling an uplink resource to the terminal device 120 for the subsequent transmission of the uplink data. In this way, resource waste can be avoided.

FIG. 9 illustrates another example method 900 of communication implemented at a network device in accordance with some embodiments of the present disclosure. For example, the method 900 may be performed at the network device 110 as shown in FIG. 1. For the purpose of discussion, in the following, the method 900 will be described with reference to FIG. 1. It is to be understood that the method 900 may include additional blocks not shown and/or may omit some blocks as shown, and the scope of the present disclosure is not limited in this regard. This embodiment describes the behavior upon transition from an inactive state to an idle state.

As shown in FIG. 9, at block 910, the network device 110 may receive, from the terminal device 120, a third indication about a change of the terminal device 120 from the inactive state to an idle state. In some embodiments, the network device 110 may receive the third indication via a RRC message. In some alternative embodiments, the network device 110 may receive the third indication via a MAC CE. In some alternative embodiments, the network device 110 may receive the third indication via a PHY layer indication. Other details are similar with that described in connection with the transmission of the third indication, and are not repeated here.

In response to receiving the third indication, at block 920, the network device 110 may stop scheduling an uplink resource to the terminal device 120 for the subsequent transmission of the uplink data. In this way, resource waste can be avoided.

With the above SDT control scheme implemented at a network device, network response to the first shot SDT and subsequent SDT are provided and UE behavior in case of cell reselection and state transition is also provided.

FIG. 10 is a simplified block diagram of a device 1000 that is suitable for implementing embodiments of the present disclosure. The device 1000 can be considered as a further example implementation of the network device 110 or the terminal device 120 as shown in FIG. 1. Accordingly, the device 1000 can be implemented at or as at least a part of the network device 110 or the terminal device 120.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1010 stores at least a part of a program 1030. The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 1030 is assumed to include program instructions that, when executed by the associated processor 1010, enable the device 1000 to operate in accordance with the embodiments of the present disclosure, as discussed herein with reference to FIGS. 1 to 9. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1020 may form processing means 1050 adapted to implement various embodiments of the present disclosure.

The memory 1020 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1020 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of a terminal device, the method comprising:
receiving, from a network device, a Radio Resource Control (RRC) Release message comprising information indicating a Data Radio Bearer (DRB) configured for Small Data Transmission (SDT)
wherein the RRC Release message includes a suspend configuration;
determining to initiate a resume procedure for the SDT in an inactive state based on a condition that the DRB configured to SDT supports a transmission of a first uplink data in the inactive state;
determining, based on the suspend configuration, to suspend the DRB, a first signaling radio bearer (SRB), and a second SRB configured for the SDT;
performing the resume procedure for the DRB, the first SRB and the second SRB; and
transmitting, to the network device, the first uplink data in the inactive state, based on the DRB, the first SRB and the second SRB.

2. The method of claim 1, wherein the terminal device determines to initiate the procedure for the SDT further based on a condition that pending uplink data is mapped to radio bearers for the SDT.

3. The method of claim 1, further comprising:
receiving, from the network device, system information comprising information indicating the threshold.

4. The method of claim 1, further comprising:
determining whether configured grant information is configured for the SDT;
in accordance with a determination that the configured grant information is configured for the SDT, determining whether a time advance (TA) associated with the SDT is valid;

in accordance with a determination that the TA is valid, performing, based on the configured grant information, the resume procedure for the SDT; and
in accordance with a determination that the configured grant information is not configured or that the TA is not valid, performing, based on a random access procedure, the procedure for the SDT.

5. The method of claim 1, further comprising:
entering an idle state in response to reselecting from a first cell served by the base station to a second cell served by a second network device during the procedure for the SDT.

6. The method of claim 1, further comprising:
performing subsequent transmission based on configured grant or dynamic grant.

7. A method of network device, the method comprising:
transmitting, to a terminal device, a Radio Resource Control (RRC) Release message comprising information indicating a Data Radio Bearer (DRB) configured for Small Data Transmission (SDT),
wherein the RRC Release message includes a suspend configuration,
wherein a resume procedure for the SDT in an inactive state is determined to be initiated based on a condition that the DRB configured to SDT supports a transmission of a first uplink data in the inactive state,
wherein the suspend configuration suspends the DRB, a first signaling radio bearer (SRB), and a second SRB configured for the SDT, and
wherein the resume procedure is performed for the DRB, the first SRB and the second SRB; and
receiving, from the terminal device, the first uplink data in the inactive state, based on the DRB, the first SRB and the second SRB.

8. The method of claim 7, wherein the resume procedure for the SDT is determined to be initiated based on a comparison between a size of the first uplink data for the SDT and a threshold.

9. The method of claim 7, further comprising:
transmitting, to the terminal device, system information comprising information indicating the threshold.

10. The method of claim 7, wherein the transmitting comprises:
in accordance with a determination that configured grant information is configured for the SDT, and that a time advance (TA) associated with the SDT is valid, performing, based on the configured grant information, the resume procedure for the SDT; and
in accordance with a determination that the configured grant information is not configured or that the TA is not valid, performing, based on a random access procedure, the resume procedure for the SDT.

11. The method of claim 7, wherein, in response to a reselection from a first cell served by the network device to a second cell served by a second network device during the procedure for the SDT, the terminal device enters an idle state.

12. The method of claim 7, further comprising:
receiving subsequent transmission based on configured grant or dynamic grant.

13. The method of claim 7, wherein subsequent transmission is performed based on configured grant or dynamic grant.

14. The method of claim 7, wherein the DRB, a first signaling radio bearer (SRB), and a second SRB configured for the SDT, are determined to be suspended;

wherein the DRB, the first SRB, and the second SRB are resumed, and wherein the method further comprises receiving the pending uplink data that is transmitted by the terminal device while remaining in the inactive state, based on the DRB, the first SRB, and the second SRB.

15. A terminal device comprising:

a memory storing instructions; and a processor configured to execute the instructions to:

receive, from a network device, a Radio Resource Control (RRC) Release message comprising information indicating a Data Radio Bearer (DRB) configured for Small Data Transmission (SDT), wherein the RRC Release message includes a suspend configuration;

determine to initiate a resume procedure for the SDT in an inactive state based on a condition that the DRB configured to SDT supports a transmission of a first uplink data in the inactive state;

determine, based on the suspend configuration, to suspend the DRB, a first signaling radio bearer (SRB), and a second SRB configured for the SDT;

perform the resume procedure for the DRB, the first SRB and the second SRB; and transmit, to the network device, the first uplink data in the inactive state, based on the DRB, the first SRB and the second SRB.

16. The terminal device of claim 15, wherein the processor is further configured to execute the instructions to:

determine to initiate the procedure for the SDT further based on a condition that pending uplink data is mapped to radio bearers for the SDT.

17. The terminal device of claim 15, wherein the processor is further configured to execute the instructions to:

receive, from the network device, system information comprising information indicating the threshold.

18. The terminal device of claim 15, wherein the processor is further configured to execute the instructions to:

enter an idle state in response to reselecting from a first cell served by the network device to a second cell served by a second network device during the procedure for the SDT.

* * * * *